US 6,424,818 B1

(12) United States Patent
Hirono

(10) Patent No.: US 6,424,818 B1
(45) Date of Patent: Jul. 23, 2002

(54) COMMUNICATION SYSTEM USING RELAYED RADIO CHANNELS

(75) Inventor: Masahiko Hirono, Yokosuka (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/242,217

(22) PCT Filed: Jun. 24, 1998

(86) PCT No.: PCT/JP98/02803

§ 371 (c)(1),
(2), (4) Date: Feb. 9, 1999

(87) PCT Pub. No.: WO98/59463

PCT Pub. Date: Dec. 30, 1998

(30) Foreign Application Priority Data

Jun. 24, 1997 (JP) .............................. 9-167781

(51) Int. Cl.[7] ................................ H04Q 7/20
(52) U.S. Cl. .................... 455/11.1; 455/15; 455/450
(58) Field of Search .................. 455/557, 450, 455/452, 466, 569, 512, 514, 11.1, 15; 370/349, 338

(56) References Cited

U.S. PATENT DOCUMENTS

| 4,837,800 | A | * | 6/1989 | Freeburg et al. ............ 455/557 |
| 4,887,265 | A | * | 12/1989 | Felix ...................... 455/450 X |
| 5,450,472 | A | * | 9/1995 | Brax ........................... 455/557 |
| 5,574,977 | A | * | 11/1996 | Joseph et al. ................ 455/452 |
| 5,726,984 | A | * | 3/1998 | Kubler et al. ................ 370/338 |
| 5,777,991 | A | * | 7/1998 | Adachi et al. ............... 370/352 |
| 5,884,190 | A | * | 3/1999 | Lintula ....................... 455/557 |
| 6,026,119 | A | * | 2/2000 | Funk et al. ................... 375/222 |
| 6,073,030 | A | * | 6/2000 | Nair et al. ................... 455/557 |
| 6,075,860 | A | * | 6/2000 | Ketcham ..................... 380/247 |
| 6,091,967 | A | * | 7/2000 | Kruys et al. ................. 455/557 |

FOREIGN PATENT DOCUMENTS

| JP | 5-014270 A | 1/1993 |
| JP | 6-503221 W | 4/1994 |

(List continued on next page.)

OTHER PUBLICATIONS

InternetWorking Research and Experience vol. 6 No. Dec. 1995, Wiley, Dec. 31, 1995, Chikarmane V. et al., "Implementing Mobile IP Routing in 4.3 BSD Unix: A Case Study", pp. 209–227.
Proceedings of ACM SIGCOMM' 91 (Computer Communication Review vol. 21 No. 4 Sep. 1991) Communications Architectures & Protocols, Sep. 3, 1991, Ioannidis J. et al., "IP–Based Protocols for Mobile Internet–working", pp. 235–245.

(List continued on next page.)

Primary Examiner—Nay Maung
(74) Attorney, Agent, or Firm—Brinks Hofer Gilson & Lione

(57) ABSTRACT

In a communication system, a communication control apparatus is disposed in a mobile object. The communication control apparatus relays information exchanged between a plurality of radio terminals carried into the mobile object and a network side. The communication control apparatus comprises a communication control server which performs establishment of a radio channel between it and a base station at the network side, and establishment of a radio channel between it and a radio terminal according to a communication request from the radio terminal, and a communication unit which performs a radio communication with the radio terminal and a radio communication with the base station, using each radio channel established by the communication control server. The communication control server has an agent function for providing a communication reservation or a packet transmission to a user of a radio terminal in case that it cannot establish a radio channel between it and the base station corresponding to a communication request at a point of time when it has received the communication request from the radio terminal.

34 Claims, 11 Drawing Sheets 10-1 TO 10-n : MOBILE OBJECTS
10 : COMMUNICATION CONTROL APPARATUS
16-1 TO 16-n, 17 : MOBILE IP AGENTS

FOREIGN PATENT DOCUMENTS

| | | |
|---|---|---|
| JP | 6-152511 A | 5/1994 |
| JP | 6-224842 A | 8/1994 |
| JP | 6-244780 A | 9/1994 |
| JP | 8-335906 A | 12/1996 |
| JP | 9-084126 A | 3/1997 |
| JP | 9-130862 A | 5/1997 |

OTHER PUBLICATIONS

Masahi Onuki, et al., "Feature Article Mobile Packet Communication System (in Japanese)", pp. 6–37, NTT DoCoMo Technical Journal, vol. 5, No. 2, NTT Mobile Communication Network Inc., Jul. 1, 1997.

* cited by examiner

COMMUNICATION SYSTEM USING RELAYED RADIO CHANNELS

TECHNICAL FIELD

The present invention relates to a communication system, a communication control method and a communication control apparatus for performing communication by wireless between a radio terminal and a network.

BACKGROUND ART

In recent years, mobile radio communication services spread and a word "mobile computing" also has taken root in general. A mobile computation being in wide use at the present time is performed by connecting a personal computer through an adapter to a portable telephone subscribing to a mobile radio communication service. FIG. 11 shows an embodiment of a communication system in which a mobile computation of this kind is performed.

In FIG. 11, 1-1 designates a mobile station for performing a mobile computation, and is composed of a personal computer 1a, a radio terminal 1b, and an adapter 1c for connecting both of them with each other. The radio terminal 1b designates a radio terminal subscribing to a mobile radio communication network service, and is a portable telephone for example.

2-1 to 2-h designate base stations of a mobile radio communication network, and each of them performs communication through a radio channel with the radio terminal 1b. 3 designates a mobile radio communication switching control means having a function as a mobile radio communication switching station and a function as a mobile radio communication control station. 4 designates a public network. The mobile radio communication switching control means 3 is connected with this public network. 5 designates a LAN of a corporation for example and is connected with the public network 4.

In the configuration described above, when a user originates a call from the personal computer 1a through the radio terminal 1b to a desired service access point, a radio channel is established between the radio terminal 1b and one of the base stations 2-1 to 2-h under control of the mobile radio communication switching control means 3, and a channel for linking the base station and the desired service access point with each other is established. Using a communication channel thus established, the user can receive an information providing service from a provider through the public network 4 by means of the personal computer 1a, and can access a LAN 5 of a corporation. In this case, the radio terminal 1b provides a function as a modem for performing a radio communication with the base station to the personal computer 1a.

Furthermore, a system is utilized in which a mobile station can be connected with a LAN or an Internet provider by accessing an interface to a network operator, and can receive an information service from a LAN and the like by means of packet transfer through a radio channel and the system is based on the same principle as the configuration shown in FIG. 11. A system of this kind is disclosed by, for example, pp.6 to 9 of "NTT DoCoMo Technical Journal", July 1997 issued by NTT Mobile Communication Network, Inc.

Thanks to such technologies as described above, a mobile radio communication service which has mainly provided voice communication services up to now is evolving to a service supporting not only data communication, particularly such data communication by telephone connection as a personal computer communication but also a LAN connection.

It is thought that technologies utilizing a mobile radio communication network will develop to a radio LAN taken in a broad sense in which radio terminals can be connected with each other through a radio channel and can freely move over a wide area.

In the future, however, in case of attempting to provide various communication services (data communications, voice communications and the like) utilizing such a mobile radio communication network as described above, the following problems will happen.

(1) Since a communication channel between a mobile station and a desired service access point includes a radio channel, in case that the radio channel is not good or the mobile station is not within the radio service zone of a base station, the mobile station cannot receive a communication service. In such a case, if a mobile station is within the sphere of daily action, a user can find out a communicable area and take a measure such as performing communication within the area or the like. However, when a user is moving by car or train, such a measure cannot be taken.

(2) Particularly, when a user inside a high-speed mobile object such as a train on the Shinkansen Line or the like attempts to perform a data communication, a circuit interruption is frequently caused during communication by influence of tunnels or opencuts. Therefore, it is not possible to provide efficient and user-friendly services.

(3) Furthermore, when a circuit interruption occurs frequently as described above and the number of incompleted calls is increased, an overhead operation for connecting a call becomes useless as a result, and the efficiency of a communication system is lowered.

(4) In order to build such a radio LAN taken in a wide sense as described above, it is necessary to always make an original LAN environment capable of being used as it is at a place to which a terminal (a radio terminal or a mobile station in this case) has moved even in case that each of terminals moves over a wide area. However, since a former technology utilizing a mobile radio communication network is insufficient in agent functions, it is difficult to make each radio terminal always utilize an original LAN environment at a place to which the radio terminal has moved.

DISCLOSURE OF INVENTION

The present invention is based on the consideration of such circumstances as described above, and an object of the present invention is to provide a communication system, a communication control method and a communication control apparatus which can provide a user-friendly communication service to a radio terminal user even under a poor communication environment.

In order to attain such an object, a communication system according to the present invention disposes a communication control apparatus between a radio terminal and a network side. In a preferable embodiment, each radio terminal is carried into a mobile object and a communication control apparatus is arranged in advance in such a mobile object.

A communication control apparatus relays the exchange of information between a radio terminal and a network by performing a radio communication with the radio terminal and by performing a radio communication with a base station.

The communication control apparatus is provided with a communication control server for performing a radio channel control between it and a radio terminal and for performing a radio channel control between it and a base station, and a communication unit for performing a radio communication with a radio terminal and a radio communication with a base station using radio channels established by the communication control server.

Main control functions included in channel control functions provided by the communication control server are as follows:

In case that a communication control server has received a communication request from a radio terminal and the server cannot rapidly establish a radio channel between it and the base station in response to the communication request, the server transmits a notification indicating to reject the communication request to the radio terminal.

In another embodiment, in case that a communication control server has received a communication request from a radio terminal and the server cannot rapidly establish a radio channel between it and the base station in response to the communication request, the server reserves the communication request. The server starts communication between the radio terminal and the network side when the server has established the radio channel. That is to say, in case that the server cannot provide a real time communication requested by a user, it provides an alternative means as the second best measure.

In a further other embodiment, in case that a communication control server has received a communication request from a radio terminal and the server cannot rapidly establish a radio channel between it and the base station in response to the communication request, the server sends a packet transmission request to the radio terminal. When a packet has been transmitted from the radio terminal, the server stores the packet. The server transmits the packets thus stored to the network when it has established the radio channel between it the base station.

Additionally to these, a communication server provides to a radio terminal such various agent functions as a control function and the like in case that it has received communication requests of plural kinds being different in priority from one another from radio terminals.

According to the present invention, since a communication control apparatus performs a channel control between it and a network side instead of a radio terminal, load on the radio terminal side is lightened. Furthermore, it is possible to provide a user-friendly communication service in which a communication state between a radio terminal and a network side is hidden to a user of each radio terminal by means of agent functions provided in the communication control apparatus.

BEST MODE FOR CARRYING OUT THE INVENTION

A: First Preferred Embodiment (1) Configuration of This Embodiment

Figure 1:
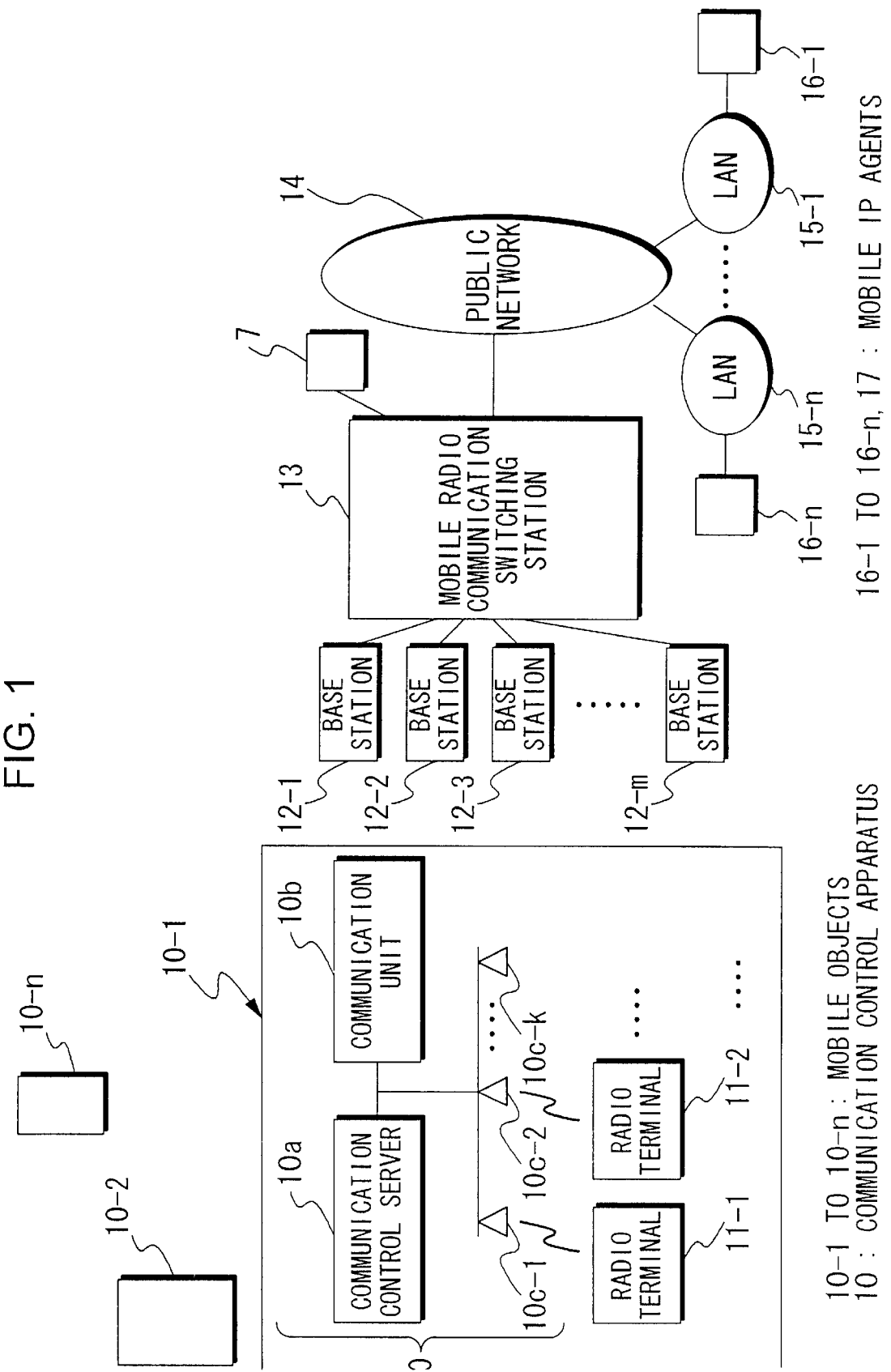
FIG. 1 shows the overall configuration of a communication system according to a first embodiment of the present invention.

FIG. 1 is a block diagram showing the configuration of a communication system according to a first preferred embodiment of the present invention.

A communication system according to this embodiment is composed of components at a mobile object side and components at a network side.

First, components of a mobile object side are described.

In FIG. 1, each of "10-j" (j=1 to n) is a mobile object. These mobile objects are, for example, such a passenger coach capable of accommodating plural radio terminals as a train on the Shinkansen Line or other railway vehicles, a bus and a passenger boat. These mobile objects may be such a vehicle other than a passenger vehicle as an ambulance.

A communication control apparatus 10 and one or more radio terminals 11-j (j=1 to m) under the communication control apparatus 10 are arranged in each mobile object 10-j.

Each radio terminal 11-j (j=1 to m) can perform an information transmission between it and a network side through the communication control apparatus 10. The kind of information to be transmitted and the form of transmission between it and the network side are not limited in particular. That is to say, each radio terminal can exchange various kinds of information such as voices, data and the like between it and the network side. Each radio terminal can perform an information transmission between it and the network side in various forms of a channel switching type traffic, a packet switching type traffic and the like.

Each one of the radio terminals 11-j (j=1 to m) is carried by a passenger or the like into a mobile object 10-j, and is a publicly known radio terminal using an existing technology. Each radio terminal is for example a portable telephone using a PDC method, a device made up of a personal computer, a portable telephone connected and an adapter connecting them each other, or a PDA having a radio device built in it, but may be some device other than these. This embodiment can be implemented without applying any improvement to these radio terminals.

This embodiment is mainly characterized by the communication control apparatus 10 to provide a user-friendly communication service (described later) to each user of a radio terminal even in a poor communication environment.

This communication control apparatus 10 is composed of a communication control server 10a, a communication unit 10b, and a plurality of antennas 10c-j (j=1 to k) for communicating with radio terminals.

The communication control server 10a has the following functions.

a. Mode 1

In the mode 1, the communication control server 10a establishes at once a radio channel between the communication unit 10b and the network side in response to a request from a radio terminal 11-j, and provides a communication service using this radio channel to the radio terminal 11-j. That is to say, in this mode 1, the communication control server 10a provides a real time communication service to a user. In this mode 1 and in modes 2 and 3 described later, a channel between a radio terminal 11-j and the communication control apparatus 10, and a channel between the communication control apparatus 10 and the network are different from each other. A radio terminal 11-j does not perform a direct access to the network side.

b. Mode 2

In the mode 2, in case that the communication control server 10a cannot meet a communication request from a radio terminal 11-j for a reason that a channel state between it and the network is not good and the like, it performs reservation for the communication request. When communication has become possible, the communication control server 10a sends the reserved communication request to the network side and establishes a radio channel, and provides a communication service using this radio channel to the radio terminal 11-j.

c. Mode 3

The mode 3 is a mode in which the communication control server 10a exhibits its agent functions. In the mode 3, when the communication control server 10a cannot meet a communication request from a radio terminal 11-j for a reason that a channel state is not good and the like but the radio terminal side needs the communication, the communication control server 10a accepts a packet transmission request. That is to say, the communication control server 10a reserves data packets from a radio terminal 11-j in storing means such as a buffer or the like not illustrated, and transmits the data packets thus reserved to the network side, utilizing a period during which a channel state between it and the network side is good.

One of the modes 1 to 3 described above is selected, for example, according to setting of a switch provided on the communication control apparatus 10.

In addition to such mode setting by a switch as described above, it can do also to set a mode according to the information for specifying the mode, the information being sent by wireless from the network side. Every mobile object does not have to be provided with a communication control apparatus provided with the modes 1 to 3, but some mobile object may be provided with a communication control apparatus provided with only one or two operation modes out of the modes 1 to 3.

Figure 2:
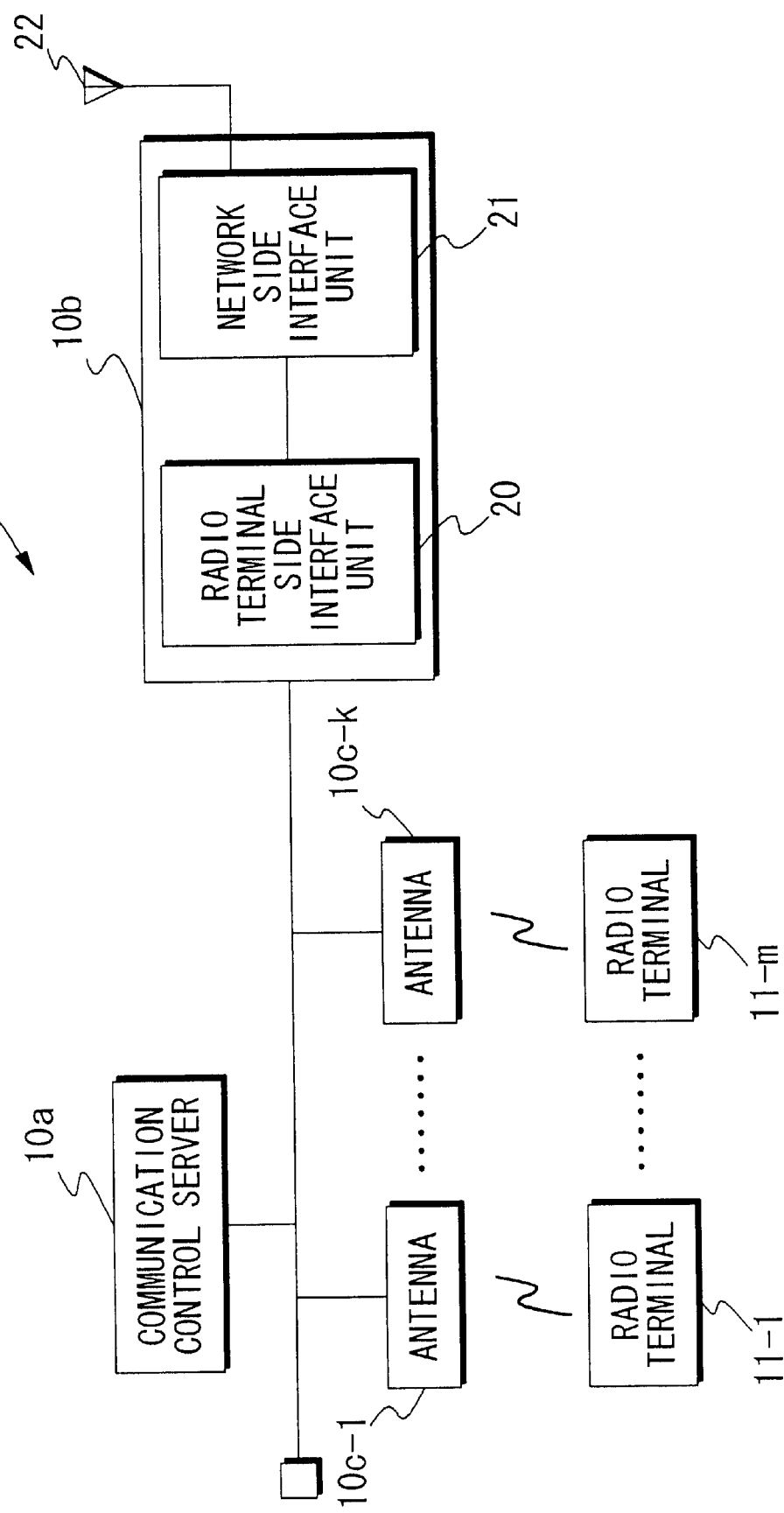
FIG. 2 is a block diagram showing the composition of a communication control apparatus of the same embodiment.

Next, as shown in FIG. 2, the communication unit 10b is composed of a radio terminal side interface unit 20, a network side interface unit 21, and an antenna 22.

The radio terminal side interface unit 20 performs communication with a radio terminal 11-j (j=1 to m) through one of the antennas 10c-j (j=1 to k). The network side interface unit 21 performs communication with the network side through an antenna 22.

Next, components of the network side are described.

In FIG. 1, 12-j (j=1 to m) designate base stations of a mobile radio communication network. These base stations perform communication with the communication control apparatus of the mobile objects 10-j (j=1 to n) or a mobile station other than these.

13 designates mobile radio communication switching control means which has a function as a mobile radio communication switching station and a function as a mobile radio communication control station.

The function as a mobile radio communication switching station includes such controls as registration of position of a mobile object or a mobile station, tracking telephone exchange, authentication at the time of data transmission, accounting and the like.

The function as a mobile radio communication control station includes a channel control and the like between a base station and a mobile object and the like.

The mobile radio communication switching control means 13 is connected with a public network 14. The public network 14 has LANS 15-j (j=1 to n) connected with it.

In this embodiment, each radio terminal in each mobile object 10-j (j=1 to n) is connected with one of the LANs 15-j (j=1 to n) of the network side if necessary, and is united with the LAN into one body to form a mobile LAN. As means for forming such a mobile LAN, the LANs 15-j (j=1 to n) are respectively provided with mobile IP (Internet Protocol) agents 16-j (j=1 to n) and the mobile radio communication switching control means 13 is provided with a mobile IP agent 17.

Describing in more detail, this is as follows:

Ordinarily, a terminal connected with a LAN recognizes its LAN environment and then receives a service provided through the LAN. Components of a communication environment of a LAN in this case are, for example, a method for giving an IP address, a name server advice, setting of a fireball, a proxy server address and the like.

In order to make a terminal connected with a LAN be able to freely move, it is necessary to make the terminal be able to use its original communication environment as it is also in a place to which it has moved.

A technology for solving such a problem is a mobile IP technology.

In a system shown FIG. 1, the mobile radio communication switching control means 13 and the LANs 15-j (j=1 to n) each are provided with a mobile IP agent.

There is an IPinIP as a typical mobile IP of these mobile IPs. When a communication channel, for example, between the communication control apparatus 10 of a mobile object 10-j and a LAN 15-j is established by a mobile IP of this kind, a radio terminal 11-j in this mobile object 10-j can be connected through the communication control apparatus 10 to a LAN 15-n of the network side, and thanks to this, communication between the radio terminal 11-j and the LAN 15-n can become possible.

(2) Operation of This Embodiment

Figure 3:
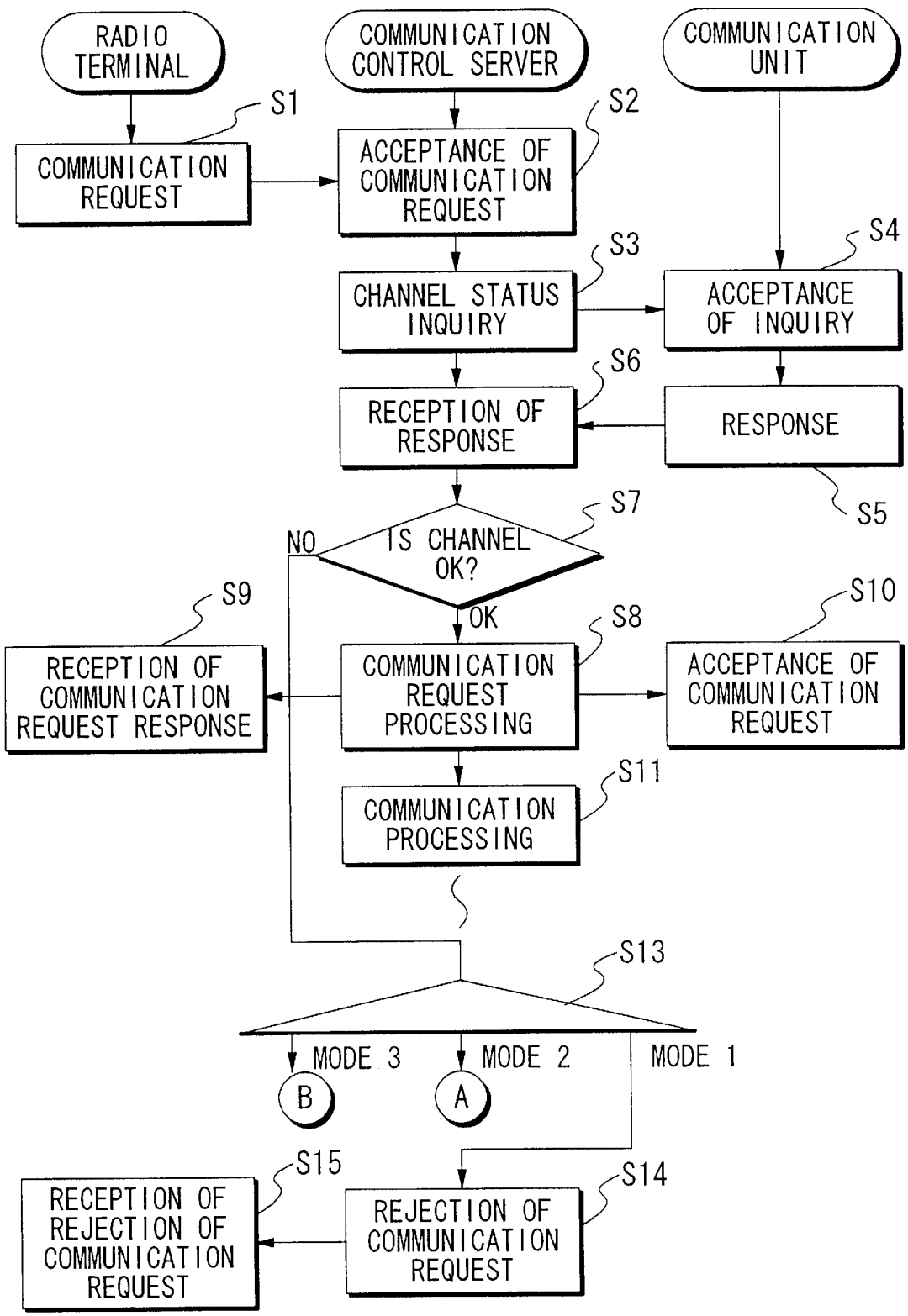
FIG. 3 is a flowchart showing operation of a communication control apparatus of the same embodiment at the time of requesting communication.
Figure 4:
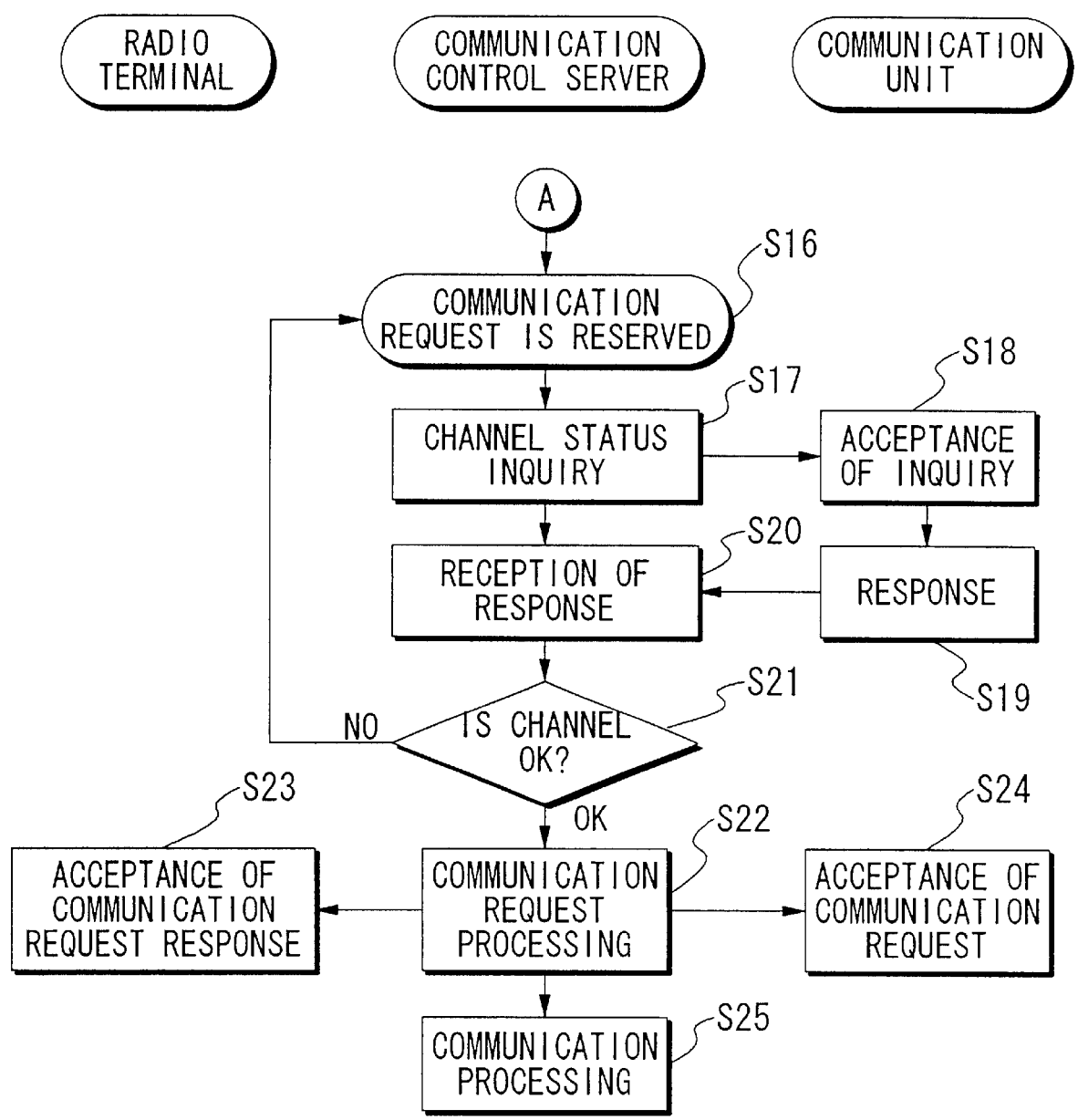
FIG. 4 is a flowchart showing operation in mode 2 of a communication control apparatus of the same embodiment.
Figure 5:
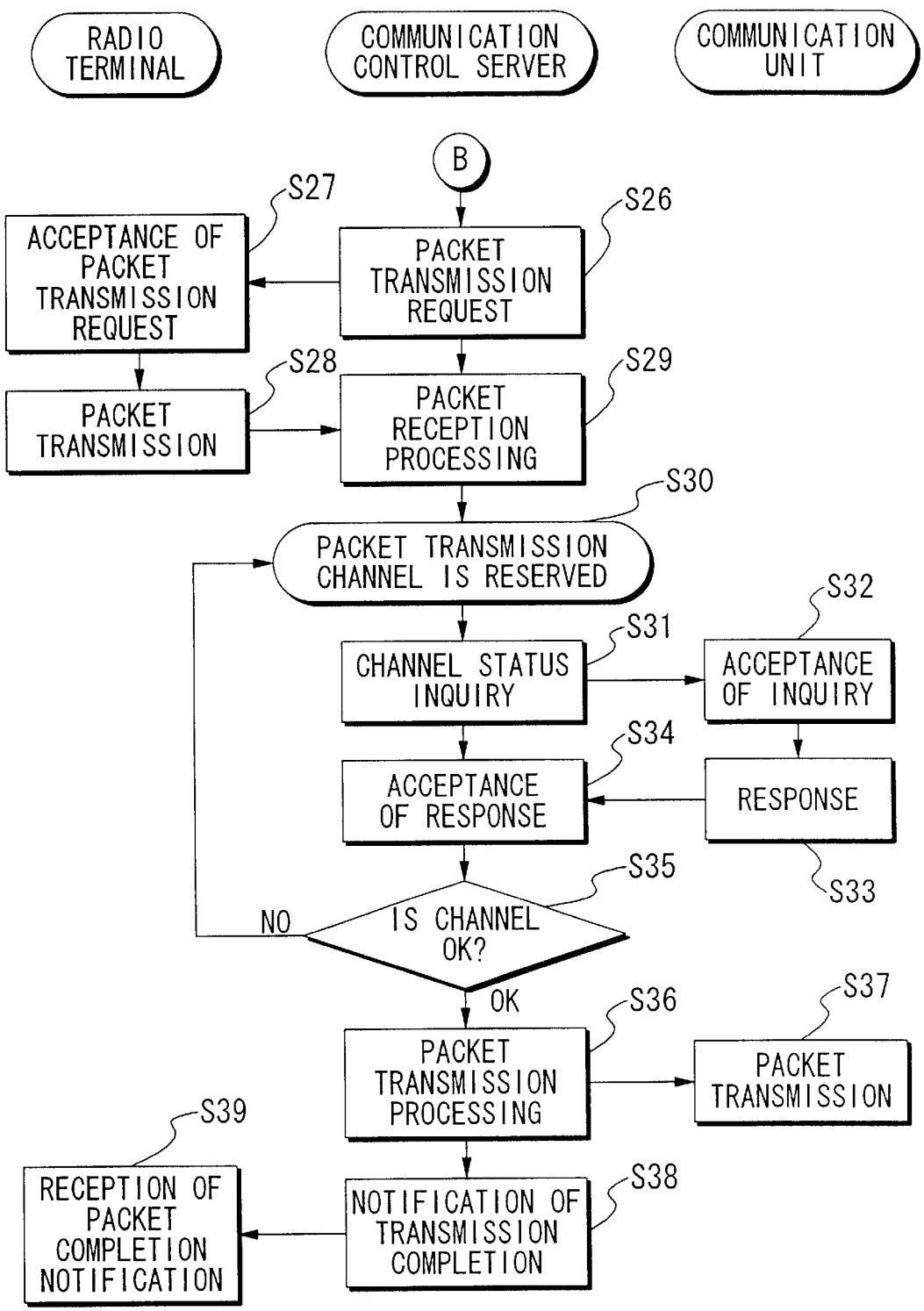
FIG. 5 is a flowchart showing operation in mode 3 of a communication control apparatus of the same embodiment.

FIGS. 3 to 5 are flowcharts showing operation of a communication control apparatus in this embodiment. Operation of this embodiment is described with reference to these figures in the following, taking as an example a case where a radio terminal 11-j in a mobile object 10-j originates a call in order to perform connection with a LAN 15-1.

First, as shown in FIG. 3, a communication request is outputted from the radio terminal 11-j (step S1). This communication request contains the address of a service access point which is an entrance of the LAN 15-1.

When the communication control server 10a receives this communication request (step S2), it outputs a status inquiry to the communication unit 10b (step S3).

When the communication unit 10b receives this status inquiry (step S4), it detects a communication status, namely, whether or not a good radio communication can be performed with the network side, and sends a response containing a result of it to the communication control server 10*a* (step S5).

When the communication control server 10*a* receives the response from the communication unit 10*b* (step S6), it judges whether or not communication can be performed (step S7).

In case that the communication control server 10*a* has judged that communication can be performed, it performs a process for establishing a channel (step S8). That is to say, it generates communication request information for requesting connection with the service access point. Next, the communication control server 10*a* establishes a channel reaching the service access point by sending this communication request information through the communication unit 10*b* to a base station of the network side (step S10), and sends a communication request response to the radio terminal 11-j (step S9). The communication unit 10*b* which has received the communication request response starts data communication with the LAN 15-1 (step S11).

On the other hand, in case that the communication control server 10*a* has judged that communication cannot be performed in step S7, it performs a process corresponding to a mode set at the present time (step S13).

First, in case that mode 1 is set, the communication control server 10*a* rejects a communication request from the radio terminal 11-j (step S14), and issues a rejection of communication request to the radio terminal 11-j (step S15). As a result, the radio terminal side ends processing the communication request.

Next, it is assumed that mode 2 has been set when it judges that communication cannot be performed in step S7. Operation in this case results in following a flow shown in FIG. 4.

First, the communication control server 10*a* performs reservation of the communication request (step S16). That is to say, in order to prepare for an opportunity of transmission being expected to come after that, it stores the communication request information containing the address of the service access point.

Next, the communication control server 10*a* outputs a status inquiry to the communication unit 10*b* (step S17).

When the communication unit 10*b* receives this status inquiry (step S18), it detects a communication status and sends a response containing the detected communication status to the communication control server 10*a* (step S19).

When the communication control server 10*a* receives this response (step S20), it judges whether or not communication can be performed (step S21).

In case that the communication control server 10*a* has judged that communication can be performed, in the same way as steps S8 to S10 in FIG. 3 described above it performs a communication request process for establishing a channel (step S22), transmission of a communication request response to the radio terminal 11-j (step 23), and transmission of a communication request to the communication unit 10*b* (step S24).

The communication unit 10*b* which has received the communication request response starts a data communication with the LAN 15-1 (step S25).

On the other hand, in case that the communication control server 10*a* has judged that communication cannot be performed in step S21, it performs again reservation of the communication request to the communication unit 10*b*.

Following this, until it is judged that communication can be performed a process from step S17 to S21 is repeated.

Actually, a timer (not illustrated) starts clocking in response to a communication request from the radio terminal 11-j. In case that it is not judged that the communication request can be accepted by the time when this timer ends clocking, the communication control server 10*a* rejects the communication request and issues a communication request incompletion notification to the radio terminal 11-j at the timer end timing.

Next, it is assumed that mode 3 has been set when it is judged that communication cannot be performed. Operation in this case results in following a flow shown in FIG. 5.

First, the communication control server 10*a* sends a packet transmission request to the radio terminal 11-j (step S26).

When the radio terminal 11-j receives this packet transmission request (step S27), it transmits a packet to the communication control server 10*a* (step S28).

When the communication control server 10*a* receives this packet, it stores this packet into such storing means not illustrated as a buffer and the like (step S29).

Then the communication control server 10*a* performs reservation of a packet transmission channel for the radio terminal (step S30). That is to say, the communication control server 10*a* starts performing a process of establishing a radio channel for transmitting a packet from the radio terminal 11-j.

First, the communication control server 10*a* outputs a status inquiry to the communication unit 10*b* (step S31).

When the communication unit 10*b* receives this status inquiry (step S32), it sends a response containing a communication status to the communication control server 10*a* (step S33).

When the communication control server 10*a* receives the response from this communication unit 10*b* (step S34), it judges whether or not communication can be performed (step S35).

In case that the communication control server 10*a* has judged that communication can be performed, the communication server 10*a* establishes a radio channel between it and the network side for the radio terminal 11-j having the packet transmission channel reserved and transmits a packet from the radio terminal 11-j which packet is stored in the storing means to the network side (steps S36 and S37).

Then, the communication control server 10*a* issues a packet transmission completion notification to the radio terminal 11-j (step S38), and the radio terminal 11-j recognizes the packet transmission completion (step 39).

On the other hand, in case that the communication control server 10*a* has judged that communication cannot be performed, it performs again reservation of a packet transmission channel for the communication unit 10*b* (step S30). After this, a process of steps S30 to S35 is repeated until it is judged that communication can be performed in step S35.

According to this embodiment described above, the following effects can be obtained.

a. Since a communication control apparatus disposed in a mobile object performs a channel control between it and a network side instead of each radio terminal in the mobile object, load on the radio terminal side is lightened. For example, in case that a radio terminal is used inside a mobile object in this embodiment, it is possible to reduce the transmission output of the radio terminal to about $1/100$ of that of a former radio terminal and suppress consumption of a battery.

b. Thanks to an agent function of a communication control apparatus, it is possible to provide a user-friendly communication service where a communication status between a user terminal and a network side is hidden to each user of a radio terminal.

c. Since a useless call to a network side which becomes an incompleted call is suppressed, an overhead operation of the network side can be reduced. Furthermore, the completed-call probability is improved and a radio channel is effectively utilized.

(3) Variation Examples

Variation examples of the first embodiment are described in the following.

First Variation Example

Figure 6:
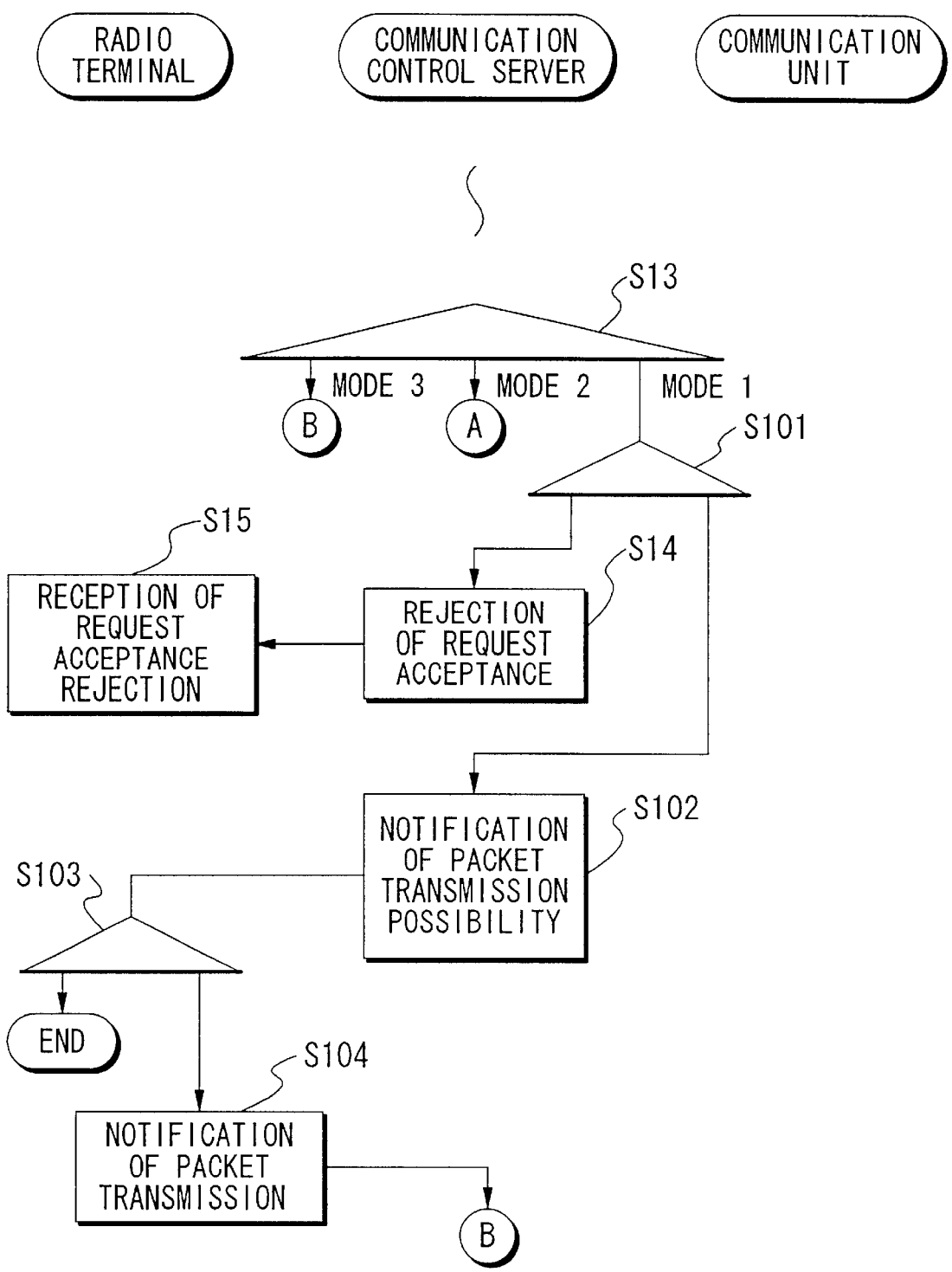
FIGS. 6 to 8 are flowcharts showing operation of variation examples of the same embodiment.

This variation example is obtained by replacing the flow of FIG. 3 in the first embodiment with a flow shown in FIG. 6. The steps shown also in FIG. 3 out of steps shown in FIG. 6 are given the same step numbers as those given in FIG. 3. Since the steps prior to step S13 in FIG. 6 are the same as those shown in FIG. 3, illustration of them is omitted.

In this variation example, a user can send plural kinds of communication requests from a radio terminal to a communication server. The user can give a priority order to each of these communication requests. In this variation example, these communication requests are handled in order of priority.

For example, suppose a case in which a real time communication request is sent as the first preference and a packet transmission request is sent as the second preference from a radio terminal to a communication control server in a state where mode 1 is set.

In this case, if the real time communication request of the first preference has been rejected due to shortage of channels and the like, the process proceeds through step S7 (see FIG. 3) and step S13 to step S101. The communication control server judges whether or not the packet transmission of the second preference can be performed. Hereupon, in case that the packet transmission can be performed, the communication control server sends a packet transmission permission notification containing conditions for the packet transmission to the radio terminal (step S102). In case that a packet transmission cannot be performed, a rejection of request comes to be performed in the same way as the first embodiment (step S14).

When the radio terminal receives the packet transmission permission notification, it judges whether or not a packet transmission is necessary (step S103), and if necessary, it notifies the communication control server that it performs the packet transmission (step S104).

As a result, according to the flow shown in FIG. 5, a packet transmission is performed from the radio terminal to the network side through the communication control server and the communication unit. Since the flow of a packet transmission was already described in the first embodiment with reference to FIG. 5, the duplicated description is omitted here.

According to this variation example as described above, even in case that the communication control server cannot meet a real time communication request of the first preference from a radio terminal, it can meet a packet transmission request of the second preference if possible, and can provide a user-friendly service.

Second Variation Example

Figure 7:
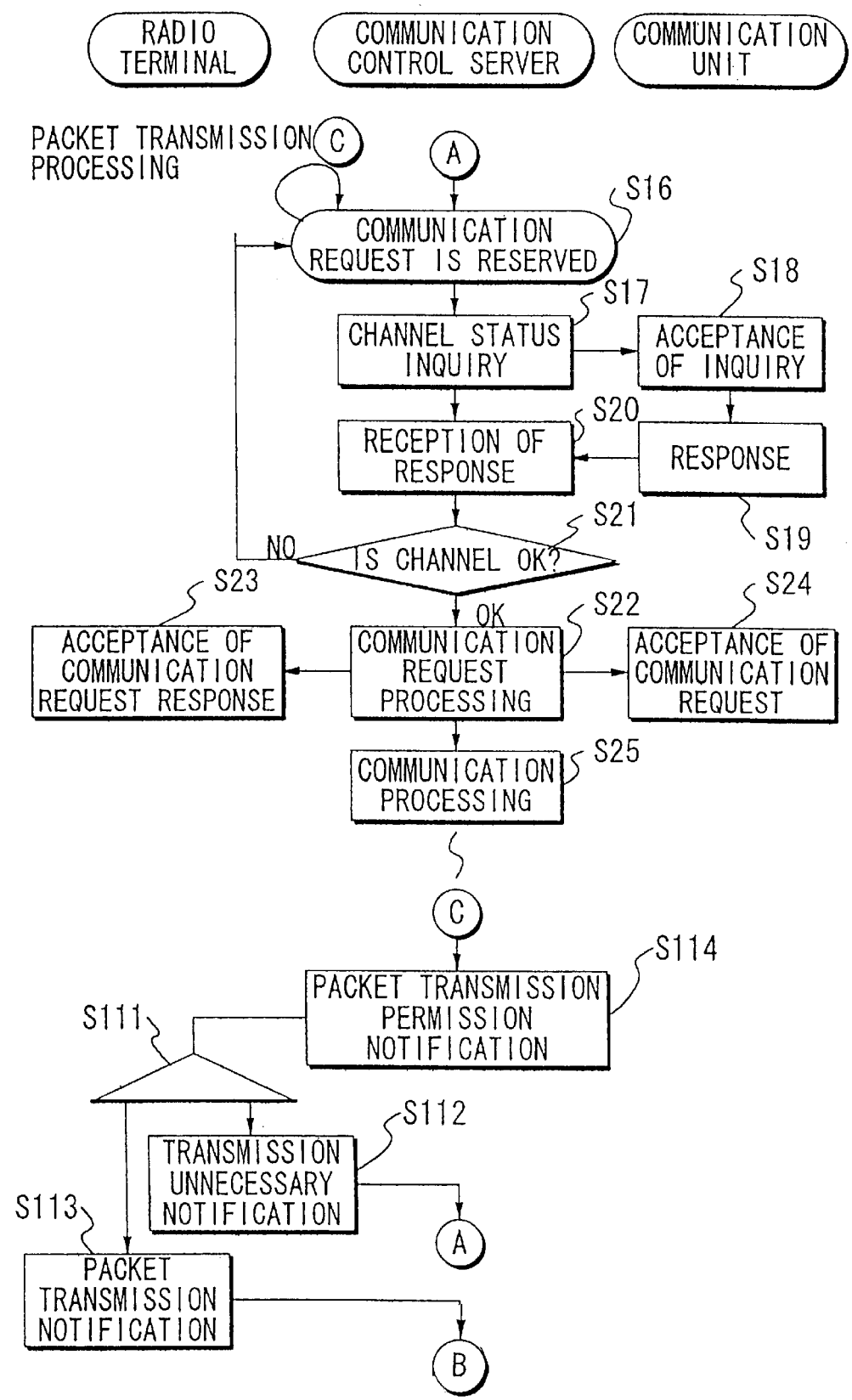
Figure 8:
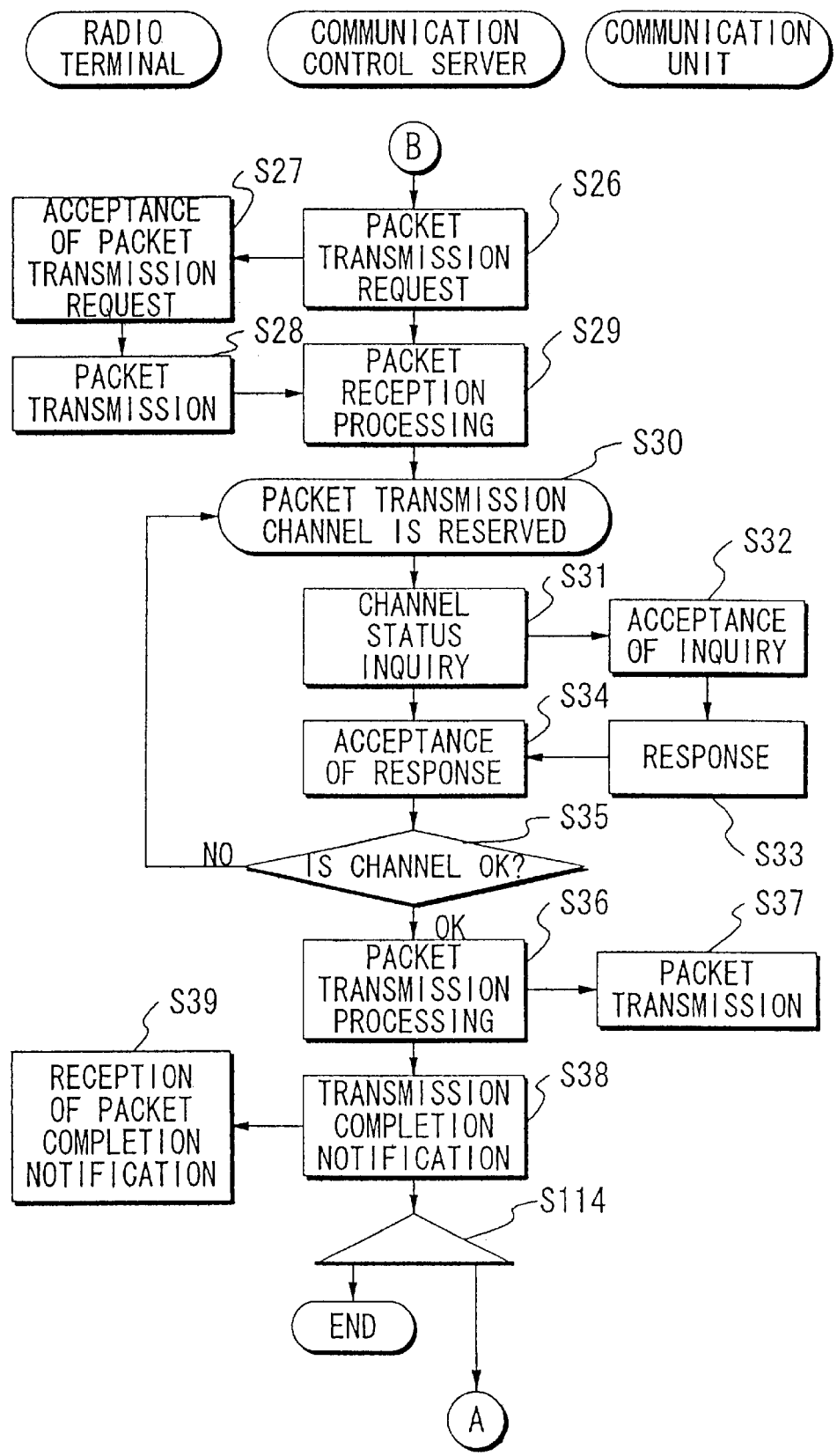

This variation example is obtained by replacing the flows of FIGS. 4 and 5 in the first embodiment with flows shown in FIGS. 7 and 8. The steps shown also in FIGS. 4 and 5 out of steps shown in FIGS. 7 and 8 are given the same step numbers as those given in FIGS. 4 and 5.

This variation example improves the operation in case that a real time communication request from a radio terminal cannot be satisfied and a communication reservation (mode 2) is performed.

First, suppose a case in which a real time communication request is sent from a radio terminal to a communication control server when mode 2 is set, and this real time communication request is rejected due to shortage of channels and the like. In this case, the process proceeds through step S7 (see FIG. 3) to step S16 of FIG. 7 and the communication control server performs a reservation process for the communication request (steps S16 to S21).

When the communication control server comes into a state where it can accept a packet transmission during the reservation process for this communication request, the communication control server sends a packet transmission permission notification containing conditions for the packet transmission to the radio terminal (step S110).

When the radio terminal receives this packet transmission permission notification, it judges whether or not the packet transmission is necessary (step S111). If the packet transmission is not necessary, the radio terminal sends a transmission-unnecessary notification to the communication control server (step S112). When the communication control server receives this transmission-unnecessary notification, it returns to a reservation process for a real time communication (steps S16 to S21).

On the other hand, in case that a packet transmission is necessary in step S111, the radio terminal sends a packet transmission notification to the communication control server (step S113).

As a result, according to a flow shown in FIG. 8, a packet transmission is performed from the radio terminal to, the network side through the communication control server and the communication unit. Since contents of a packet transmission are the same as those already described in the first embodiment with reference to FIG. 5, the duplicated description is omitted here.

When the packet transmission has been completed, the communication control server sends a transmission completion notification to the radio terminal (step S38) and judges whether or not communication is reserved (step S114). In case that communication is reserved, the communication control server returns to step S16 (FIG. 7).

When a real time communication has come to be capable of being performed during a packet transmission process, the communication control server performs preferentially a real time communication process having a high priority order. In this case the packet transmission process being in the course of processing is stopped.

According to this variation example, even in case that a communication control server cannot meet a real time communication request from a radio terminal and is performing a communication reservation process, it can meet a packet transmission request from the radio terminal if possible, and so it is possible to provide a user-friendly service.

Third Variation Example

In this variation example, a data converting means is disposed between a radio terminal side interface unit 20 and a network side interface unit 21. As the data converting means, for example, a transmission speed converting means such as a buffer and the like is conceivable. In case of using the transmission speed converting means, for example, it is possible to perform control so as to perform a packet communication between a base station and a communication control server and perform a continuous communication having a low speed of 9600 bps, 32 kbps or the like between the communication control server and a radio terminal.

Fourth Variation Example

In mode 3 (packet transmission mode) of the embodiment, a communication control server stores a packet from a radio terminal in a buffer, and this buffer is limited in capacity. Therefore, if a packet being too large in size is transmitted from a radio terminal, the packet cannot be fully stored in the buffer (namely, the packet is lost) and the radio terminal results in retransmission of the packet and so the transmission delay of a packet is increased. Conversely, if a packet being too small in size is transmitted from a radio terminal, a time until a certain amount of data is stored in the buffer is lengthened and a delay time until each packet is transmitted to a network side is made long. Thereupon, in this variation example, a communication control server presents the maximum size of a packet capable of being stored in a buffer to each radio terminal, and controls each radio terminal to transmit a packet being proper in size. Thanks to this, it is possible to minimize the delay time in packet transmission and prevent occurrence of a packet loss.

Fifth Variation Example

In the embodiments described above, a judgement is made as to judge whether or not a radio communication can be performed between a network side and a radio terminal by means of a communication unit. In this variation example, a further detailed judgement is performed. That is to say, even in case that a mobile object is within the service area of a base station, a situation in which for example a voice communication can be performed but a broad-band communication cannot but be rejected may occur depending upon the amount of traffic passing the base station at that point of time. Thereupon, in this variation example, a communication unit takes radio resources capable of being provided to a user in a mobile object, and a communication control server provides a communication service within this taken resources. For example, in case that available radio resources are deficient, a communication control server controls the communication speed. For example, in case that a broad-band communication request has been received when available radio resources are deficient, the communication control server performs control so as to perform reservation for the communication request and perform a processing corresponding to the reserved communication request at a point of time when sufficient radio resources have been secured.

Sixth Variation Example

This variation example adds a mobile Internet protocol to the communication control server 10a in FIG. 1. In this case, it is possible to form a LAN containing radio terminals 11-j (j=1 to m) as subnets obtained by partitioning them with routers and accommodate such a LAN as a subordinate of the communication control apparatus 10. In that case, each radio terminal 11-j accommodated in a subnet can remotely use a LAN environment in a LAN 15-j (j=1 to n) accessed by the communication control server 10a even if the radio terminal 11-j does not have a mobile Internet protocol in itself.

Seventh Variation Example

This variation example provides a communication control apparatus 10 in a fixed space such as a home office instead of a mobile object and makes it perform a channel control between a radio terminal near it and a base station.

B: Second Preferred Embodiment

Figure 9:
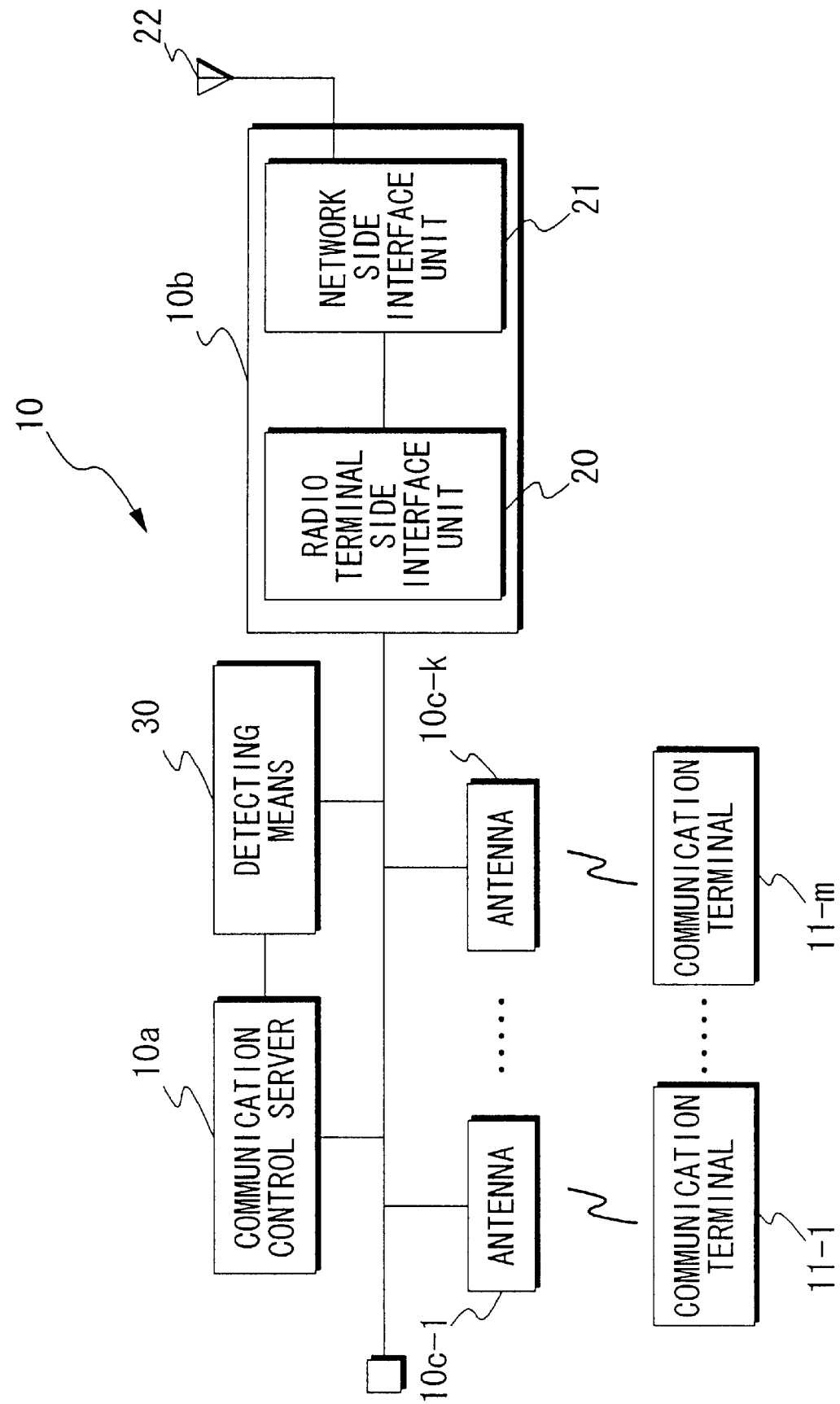
FIG. 9 is a block diagram showing the composition of a communication control apparatus of a second embodiment of the invention.

FIG. 9 is a block diagram showing the composition of a communication control apparatus 10 in a second preferred embodiment of the present invention. The second embodiment of the invention is described with reference to FIG. 9 in the following. Components in FIG. 9 corresponding to the components of the first embodiment are given the same symbols as the first embodiment and description of them is omitted.

Generally, in a mobile radio communication, for example when a railway vehicle comes into a tunnel or when an automobile runs on a road being poor in visibility, a transmission loss is increased and communication is liable to become impossible.

On the other hand, however, in case of such a mobile object as a railway vehicle, a regular bus or a regular truck whose running schedule is fixed in place and time, it is possible to estimate a time when it will come into a radio jamming area such as a tunnel from its running schedule. In addition, it is possible to correct a time when it will come into a communication jamming area on the basis of compensation data such as its running position, running speed, running time and the like by checking its actual running state, and predict accurately a happening time of communication jamming.

And also in such a mobile object as an automobile having no fixed running schedule, it is possible to estimate occurrence of a communication jamming by detecting a communication obstacle existing in the forward direction of the mobile object by means of a radar and the like.

Thereupon, in this embodiment, as shown in FIG. 9, a mobile radio communication control apparatus 10 is provided with a detecting means 30. This detecting means 30 is means which estimates a time when a communication jamming will happen on the basis of a moving state of a mobile object and other data and informs a communication control server 10a in advance that the time will come. As a manner for informing of a time when a communication jamming will happen in this case, the following manners are conceivable, for example.

a. To compute the hours when a communication jamming is expected to happen at regular time intervals and report one by one the predicted hours of occurrence of communication jamming to the communication control server 10a.

b. To compute the hours when a communication jamming is expected to happen at regular time intervals and notify in advance the communication control server of occurrence of a communication jamming at a point of time when a communication jamming is estimated to happen after a specified time (after 30 seconds for example).

In this embodiment, the following operation is performed by utilizing such a detecting means 30.

First, when a communication request is given from a radio terminal 11-j, the communication control server 10a judges whether or not a communication jamming will happen in a specified time on the basis of a report from the detecting means 30.

In case that the communication control server 10a has judged a communication jamming will happen in a specified time, it sets the communication request from the radio terminal as a channel reservation state.

After this, in case that a predicted time of occurrence of a communication jamming has elapsed and it is judged that a good communication can be performed at that point of time, the communication control server 10a establishes a communication channel between the radio terminal 11-j and the network side according to the reserved communication request.

Furthermore, for example, when the radio terminal 11-j is performing communication, it may be judged that a communication jamming will happen in a specified time. In this case, the communication control server 10a terminates once the communication of the radio terminal 11-j and reserves the communication.

After this, in case that a predicted time of occurrence of a communication jamming has elapsed and it is judged that a good communication can be performed at that point of time, the communication control server 10a re-establishes a reserved channel and restarts communication between the radio terminal 11-j and the network side.

According to this embodiment, since occurrence of a communication jamming due to coming into a communication jamming area is estimated and a channel connection with a network side is performed utilizing a period in which no communication jamming happens, it is possible to prevent a channel interruption during communication and provide a user-friendly communication service.

C: Third Preferred Embodiment

Figure 10:
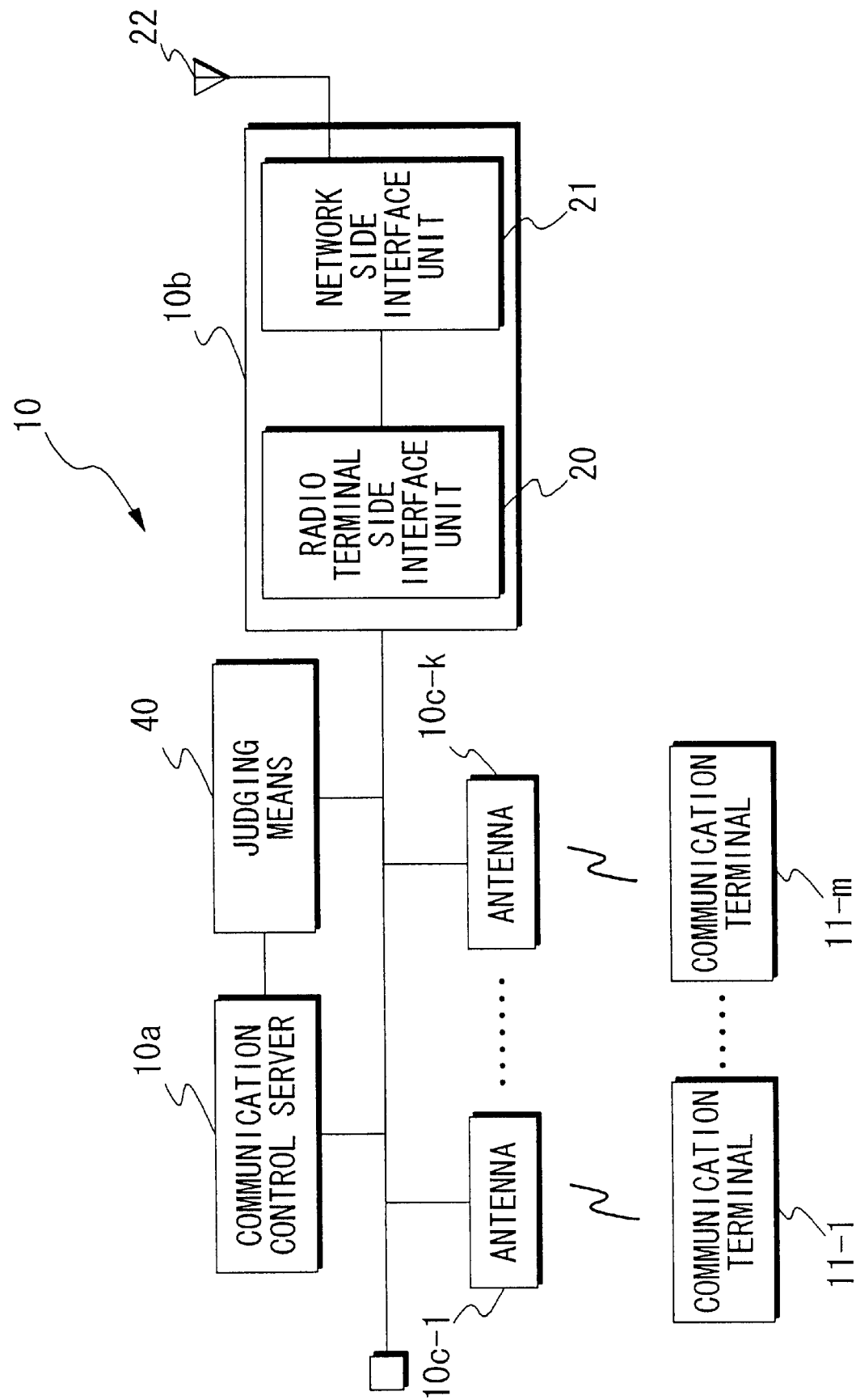
FIG. 10 is a block diagram showing the composition of a communication control apparatus of a third embodiment of the invention.
Figure 11:
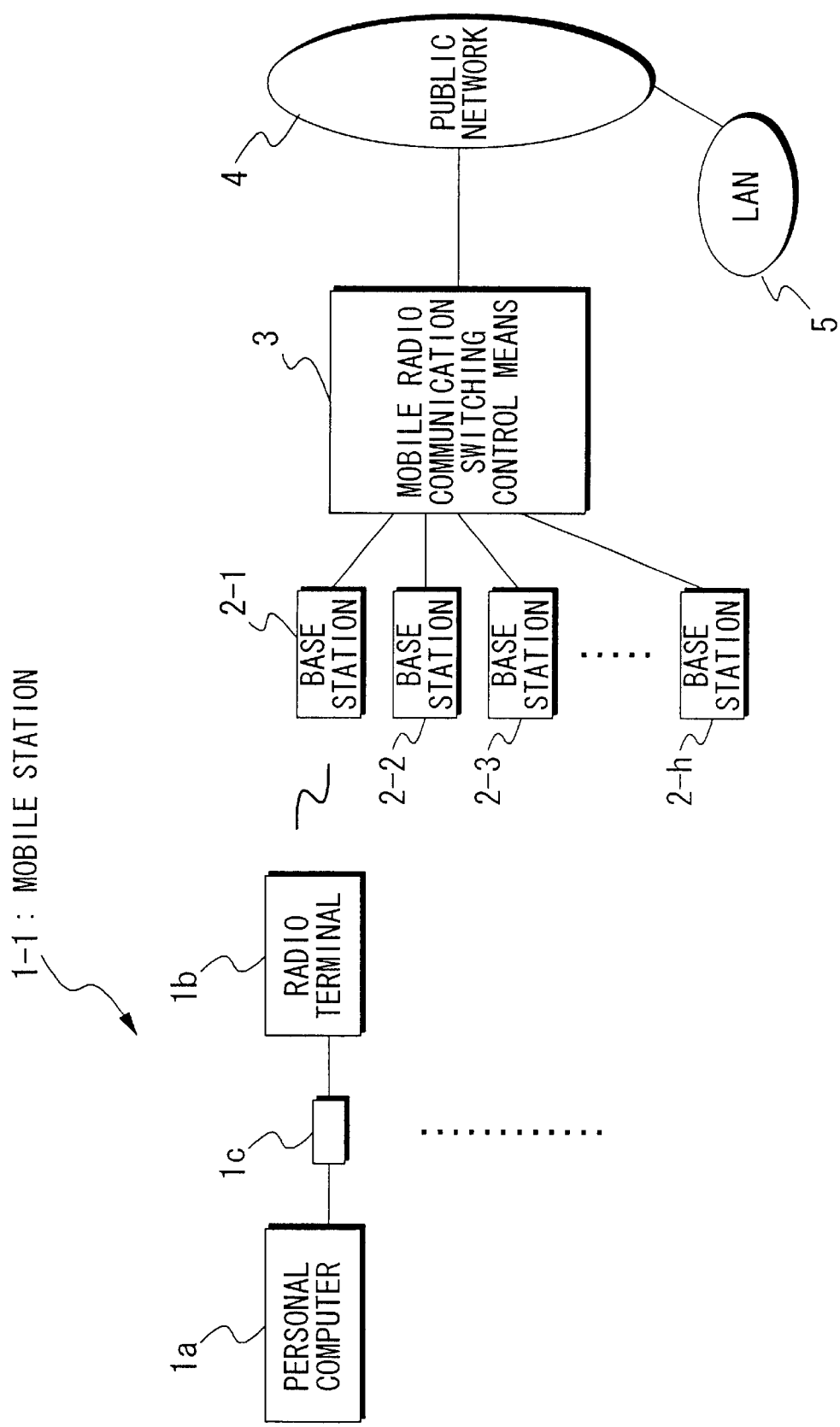
FIG. 11 shows the whole configuration of a former communication system.

FIG. 10 is a block diagram showing the composition of a communication control apparatus 10 in a third preferred embodiment of the present invention.

In this embodiment, the communication control apparatus 10 is provided with a judging means 40 for judging validity of a radio terminal 11-j.

The judging means 40 judges the validity of a radio terminal 11-j with respect to a communication request from the radio terminal 11-j, and outputs the result of judgement to the communication control server 10a. The communication control server 10a performs a channel establishing process for the radio terminal 11-j only in case that it has been judged that the radio terminal 11-j has a system validity.

The judging means 40 may inquire of a switching station at the network side or another radio terminal about the system validity of the radio terminal 11-j without judging by itself the system validity of the radio terminal 11-j.

Concretely, this embodiment is effective to such a system as a public telephone system in which communication is performed by mounting a prepaid card, a credit card or the like into a radio terminal 11-j.

In case of applying this embodiment to such a system, the judging means 40 judges the validity of a radio terminal 11-j by inquiring of an accounting apparatus of a credit card company about such a user identification as a credit card number and a password, or checking for the remainder left in a prepaid card with an accounting apparatus of a switching station at the network side.

According to this embodiment, it is possible to prevent an illegal use of a radio terminal.

What is claimed is:

1. A communication system comprising:
    a communication network;
    one or plural base stations connected with the communication network;
    one or plural radio terminals; and
    a communication control apparatus disposed between the radio terminal and the base station for relaying information exchanged between the radio terminal and the network by performing a radio communication with the radio terminal and performing a radio communication with the base station;
    wherein said communication control apparatus comprises:
        a communication control server for performing a channel control between said communication control server and a respective radio terminal, and for performing a channel control between said communication control server and a base station;
        a communication unit for performing a radio communication with the radio terminal and the base station using radio channels established by the communication control server; and
        wherein said communication unit detects a communication status with the communication network and said communication control server determines whether or not radio communication can be performed with the communication network.

2. A communication system according to claim 1, wherein the communication control apparatus is disposed in a mobile object and performs the relaying operation intended for a radio terminal inside the mobile object.

3. A communication system according to claim 1, wherein the communication control server comprises means for transmitting a rejection of communication request to a radio terminal in response to a communication request received from the same radio terminal, in case that the communication control server cannot establish a radio channel corresponding to the communication request when receiving the communication request.

4. A communication system according to claim 3, wherein the communication control server comprises means for reserving a communication request received from a radio terminal and for starting communication between the radio terminal and the network side after establishing a radio channel for the communication, in case that the communication control server cannot establish a radio channel corresponding to the communication request when receiving the communication request.

5. A communication system according to claim 3, wherein the communication control server comprises means for sending a packet transmission request to a radio terminal in response to a communication request received from the same radio terminal, and for storing packets which are received from the radio terminal, and for transmitting the packets thus received to the network after establishing a radio channel for transmitting the packets between the communication control server and a base station, in case that the communication control server cannot establish a radio channel corresponding to the communication request when receiving the communication request.

6. A communication system according to claim 3, wherein the communication control server comprises means for receiving a plurality of communication requests having different priority from a radio terminal, and performing control of a radio channel between the communication control server and a base station corresponding to a communication request which is one of the communication requests and has a priority lower than a priority of other communication request when the communication control server cannot respond to the communication request having higher priority.

7. A communication system according to claim 3, wherein the communication control server comprises:
   (a) means for bringing a real time communication request received from a radio terminal into a reserved state when the communication control server cannot rapidly establish a radio channel between the communication control server and a base station in response to the real time communication request;
   (b) means for sending a packet transmission permission notification to the radio terminal when a packet transmission can be accepted during the communication reservation;
   (c) means for storing packets which are transmitted from the radio terminal and transmitting the packets to the network side by seizing an opportunity at which the transmission is possible; and
   (d) means for making the radio terminal start communication corresponding to the communication request being in a reserved state when the communication control server has established a radio channel for the communication between the communication control server and a base station.

8. A communication system according to claim 3, wherein the communication control server comprises means for converting to each other data sent and received between the communication control server and a radio terminal, and data sent and received between the communication control server and a base station.

9. A communication system according to claim 3, wherein the communication control server comprises a mobile Internet protocol for controlling communication with a LAN.

10. A communication system according to claim 6, wherein the communication control server comprises means for presenting the size of a packet capable of being stored to the radio terminal.

11. A communication system according to claim 3, wherein the communication unit comprises means for detecting radio resources capable of being provided to the radio terminal, and the communication control server performs control for providing a communication service to the radio terminal within the detected radio resources.

12. A communication system according to claim 1, wherein the communication control apparatus comprises detecting means for estimating a time when a communication jamming will happen and, on the basis of the result of estimation, controlling how to handle a communication request from the radio terminal.

13. A communication system according to claim 1, wherein the communication control apparatus comprises judging means for judging a system validity of a radio terminal which has performed a communication request.

14. A communication system according to claim 2, wherein the mobile object is a railway vehicle, an automobile, or a ship.

15. A communication control method for controlling radio communication performed between at least one radio terminal and a communication network comprising the steps of:
   providing a communication control apparatus disposed between the radio terminal and a base station of the communication network;
   detecting a communication status between the radio terminal and the communication network with the communication control apparatus;
   determining whether or not radio communication can be performed with the communication network and the radio terminal with the communication control apparatus; and
   establishing radio channels between the radio terminal and the communication network to relay information between the radio terminal and the communication network by performing a radio communication with the radio terminal and performing a radio communication with the base station using the communication control apparatus based on the determination made above.

16. A communication control method according to claim 15, wherein the communication control apparatus transmits a rejection of communication request to a radio terminal in response to a communication request received from the same radio terminal, in case that the communication control server cannot establish a radio channel corresponding to the communication request when receiving the communication request.

17. A communication control method as defined in claim 15, wherein the communication control apparatus reserves a communication request received from a radio terminal and starts communication between the radio terminal and the network side after establishing a radio channel for the communication, in case that the communication control apparatus cannot establish a radio channel corresponding to the communication request when receiving the communication request.

18. A communication control method as defined in claim 15, wherein the communication control apparatus sends a packet transmission request to a radio terminal in response to a communication request received from the same radio terminal, and stores packets which are received from the radio terminal, and transmits the packets thus received to the network after establishing a radio channel for transmitting the packets between the communication control server and a base station, in case that the communication control apparatus cannot establish a radio channel corresponding to the communication request when receiving the communication request.

19. A communication control method as defined in claim 15, wherein the communication control apparatus sends a packet transmission request to a radio terminal in response to a communication request received from the same radio terminal, and stores packets which are received from the radio terminal, and transmits the packets thus received to the network after establishing a radio channel for transmitting the packets between the communication control server and a base station, in case that the communication control server cannot establish a radio channel corresponding to the communication request when receiving the communication request.

20. A communication control method as defined in claim 15, wherein the communication control apparatus presents the size of a packet capable of being stored to the radio terminal.

21. A communication control method according to claim 15, wherein the communication control apparatus detects radio resources capable of being provided to the radio terminal and provides a communication service to the radio terminal within the detected radio resources.

22. A communication control method according to claim 15, wherein the communication control apparatus estimates a time when a communication jamming will happen and, on the basis of this result of estimation, controls how to handle a communication request from the radio terminal.

23. A communication control apparatus comprising:
   a communication control server for establishing a radio channel between the communication control server and a radio terminal and a radio channel between the communication control server and a base station of a communication network;

a communication unit for performing a radio communication with the radio terminal and a radio communication with the base station, using each radio channel established by the communication control server; and wherein said communication unit detects a communication status with the communication network and said communication control server judges whether or not the radio communication can be performed with the communication network so that the communication control server can relay communication between the radio terminal and the communication network.

24. A communication control apparatus according to claim 23, wherein the communication control server comprises means for transmitting a rejection of communication request to a radio terminal in response to a communication request received from the same radio terminal, in case that the communication control server cannot establish a radio channel corresponding to the communication request when receiving the communication request.

25. A communication control apparatus as defined in claim 23, wherein the communication control server comprises means for reserving a communication request received from a radio terminal and for starting communication between the radio terminal and the network side after establishing a radio channel for the communication, in case that the communication control server cannot establish a radio channel corresponding to the communication request when receiving the communication request.

26. A communication control apparatus according to claim 23, wherein the communication control server comprises means for sending a packet transmission request to a radio terminal in response to a communication request received from the same radio terminal, and for storing packets which are received from the radio terminal, and for transmitting the packets thus received to the network after establishing a radio channel for transmitting the packets between the communication control server and a base station, in case that the communication control server cannot establish a radio channel corresponding to the communication request when receiving the communication request.

27. A communication control apparatus according to claim 23, wherein the communication control server comprises means for receiving a plurality of communication requests having different priority from a radio terminal, and performing control of a radio channel between the communication control server and a base station corresponding to a communication request which is one of the communication requests and has a priority lower than a priority of other communication request when the communication control server cannot respond to the communication request having higher priority.

28. A communication control apparatus according to claim 23, wherein the communication control server comprises:

(a) means for bringing a real time communication request received from a radio terminal into a reserved state when the communication control server cannot rapidly establish a radio channel between the communication control server and a base station in response to the real time communication request;

(b) means for sending a packet transmission permission notification to the radio terminal when a packet transmission can be accepted during the communication reservation;

(c) means for storing packets which are transmitted from the radio terminal and transmitting the packets to the network side by seizing an opportunity at which the transmission is possible; and (d) means for making the radio terminal start communication corresponding to the communication request being in a reserved state when the communication control server has established a radio channel for the communication between the communication control server and a base station.

29. A communication control apparatus according to claim 23, wherein the communication control server comprises means for converting to each other data sent and received between the communication control server and a radio terminal, and data sent and received between the communication control server and a base station.

30. A communication control apparatus according to claim 23, further comprising a mobile Internet protocol for controlling communication with a LAN.

31. A communication control apparatus according to claim 23, wherein the communication control server comprises means for presenting a size of a packet capable of being stored to the radio terminal.

32. A communication control apparatus according to claim 23, wherein the communication unit comprises means for detecting radio resources capable of being provided to the radio terminal, and the communication control server performs control for providing a communication service to the radio terminal within the detected radio resources.

33. A communication system according to claim 23, further comprising detecting means for detecting a moving state of the communication control apparatus and estimating a time when a communication jamming will happen, wherein the communication system controls how to handle a communication request from the radio terminal on the basis of this result of estimation.

34. A communication control apparatus according to claim 23, further providing judging means for judging a system validity of a radio terminal which has performed a communication request.

* * * * *

UNITED STATES PATENT AND TRADEMARK OFFICE
CERTIFICATE OF CORRECTION

PATENT NO. : 6,424,818 B1
DATED : July 23, 2002
INVENTOR(S) : Masahiko Hirano

It is certified that error appears in the above-identified patent and that said Letters Patent is hereby corrected as shown below:

<u>Column 14,</u>
Lines 34, 43, 55 and 66, please delete "3" and insert -- 1 --.

<u>Column 15,</u>
Lines 22, 28 and 34, please delete "3" and insert -- 1 --.
Line 54, please delete "performed".

Signed and Sealed this

Twenty-seventh Day of May, 2003

JAMES E. ROGAN
*Director of the United States Patent and Trademark Office*